United States Patent Office 3,790,476
Patented Feb. 5, 1974

3,790,476
LATICES FOR INDUSTRIAL WASTE COAGULATION
F. Steven Spoerle, Oak Lawn, and Elmer W. Palmer, Woodridge, Ill., assignors to Nalco Chemical Company, Chicago, Ill.
No Drawing. Filed Nov. 22, 1971, Ser. No. 200,848
Int. Cl. B01d 21/02; C02b 1/20
U.S. Cl. 210—47                                           10 Claims

ABSTRACT OF THE DISCLOSURE

Thickening or dewatering solids from industrial wastes comprising the addition of an aqueous solution of a water-soluble vinyl addition polymer made by the inversion of a polymeric latex.

INTRODUCTION

This invention relates to an improved method of thickening or dewatering solids from industrial wastes. More particularly, the process comprises the addition of an aqueous solution of a water-soluble vinyl addition polymer made by the inversion of a polymeric latex to industrial waste suspensions under floc forming conditions and thereafter allowing the solids to settle from the suspension to provide a clear aqueous supernatant.

Industrial wastes contain suspended solids which must be removed before these liquids are suitable for dumping in the lakes and oceans or alternatively for industrial and potable applications. The types of industrial wastes and nature and concentration of the suspended solids vary greatly. A common method for removal of suspended solids from various types of industrial wastes is by the well-known chemical process of coagulation. In the main, a method of coagulation usually comprises addition to the aqueous solution to be treated of certain chemicals known as coagulants, mixing of chemical additive and aqueous liquid whereby floc formation occurs, and subsequent removal of this floc by a variety of methods. The latter step may be effected by mechanical separation means or by merely allowing forces of gravity to work upon the agglomerated solids whereby a removable sludge layer is created.

Industrial wastes are existant in a wide variety of different types. Wastes from such industrial operations as papermaking, petroleum refining, secondary recovery of petroleum by water flooding, hydroelectric plants, atomic energy operations, metal plating, boiler plants and the like must be made free of suspended matter to avoid creation of a nuisance and pollution of lakes and streams. Typical industrial wastes are acid mine waters, coal washing waters, paper or pulp waste waters, clay slimes from aqueous solutions resulting from the benefication of uranium, potash, aluminum and other ores by hydrometallurgical processes, calcium carbonate suspensions and other suspensions of finely-divided solids in water which result from industrial processes such as mining, washing and the like. Industrial wastes are not to be construed to be limited to meaning only aqueous liquors which in lay terms are ordinarily called industrial wastes, nor should it be construed as limited to mean aqueous liquors which have actually been carried through pipes, conduits, or sewers.

Chemical treatment of industrial wastes is well known to those versed in the prior art. In the past, the inorganic materials, such as alum, lime, ferrous or ferric salts, etc., have been added to speed up settling and to aid in filtration. Recent changes in the composition of industrial waste suspensions have resulted from the use of synthetic detergents instead of soaps for washing and general cleaning. Both industrial and household waste at present may contain considerable quantities of synthetic detergents which keep solid material suspended. It, thus, appears that the purpose of the synthetic detergents as used by the housewife is to suspend and keep suspended the very particles which in industrial waste treatment are to be settled out.

Considerable effort has been spent by industry to develop an economical and efficient process for thickening and dewatering industrial wastes. Prior art attempts to optimize this process have led to the use of various anionic and cationic polymers.

Water-soluble cationic polyelectrolytes have been used in the prior art for thickening and dewatering industrial waste suspensions. These polymers are well known to the art and have been described in numerous publications and patents. Polymers most commonly used in many industrial waste applications are water-soluble homo- and copolymeric derivatives of acrylamide. Also useful are homopolymers and copolymers of other vinyl monomers such as maleic anhydride, acrylic acid, dimethylaminoethyl methacrylate, acrylonitrile, styrene and the like. Other water-soluble vinyl polymers are described in detail in the following U.S. patents: 3,418,237; 3,259,570; and 3,171,805.

Up until the present time most of the polymers described above were in the form of solid dry powders which were dissolved in water before use in specific applications. It has been discovered that the use of an aqueous solution of a water-soluble addition polymer made by the inversion of a polymeric latex exhibits exceptionally improved results in treatment of industrial wastes over the results obtained from treatment with an aqueous solution of the solid dry powder polymer.

OBJECTS

It is, therefore, an object of this invention to provide an improved method for thickening and dewatering industrial wastes.

A further object of this invention is to provide a method of optimizing the efficiency of coagulation of industrial wastes.

A more specific object is to provide a method of thickening or dewatering solids from industrial wastes comprising the addition of an aqueous solution of a water-soluble vinyl addition polymer made by the inversion of a polymeric latex to a waste suspension under floc forming conditions and therefore allowing the solids to settle from the suspension to provide a clear aqueous supernate.

Other objects will appear hereinafter.

THE INVENTION

In accordance with the invention, an improved method of thickening or dewatering solids from industrial wastes has been discovered comprising the addition of an aqueous solution of a water-soluble vinyl addition polymer formed by the inversion of a polymeric latex added to the industrial wastes under floc forming conditions and thereafter allowing the solids to settle from the industrial waste to provide a clear aqueous supernate. The polymeric latex is produced by the steps of:

(A) Forming a water-in-oil emulsion from:

(1) water which contains dissolved therein a water-soluble ethylenic unsaturated monomer, thereby producing a monomer phase which has a concentration of from 30–70% by weight of said emulsion;
(2) an inert hydrophobic liquid;
(3) a water-in-oil emulsifying agent in a concentration of from 0.1–10% by weight;
(4) a free radical initiator;

(B) Heating said emulsion under free radical forming conditions to polymerize the water-soluble ethylenic unsaturated monomer forming a polymer which is contained in the emulsion; and (C) Polymerizing said monomer in the water-in-oil emulsion to produce a polymeric latex.

As indicated, this process produces a polymeric latex which comprises a water-in-oil emulsion which contains dispersed therein a finely-divided water-soluble vinyl addition polymer.

This process involves the formation of an emulsion by the addition of a monomer phase to an oil phase containing an emulsifying agent. The monomer phase is comprised of water-soluble ethylenic unsaturated monomer in an aqueous solution. The monomer phase concentration may range from 30–70% by weight of the emulsion. The oil phase is any inert hydrophobic liquid such as hydrocarbons and substituted hydrocarbons. The inert hydrophilic liquid concentration ranges from 5–40% by weight of the emulsion. Any emulsifying agent which is oil soluble is acceptable.

All known polymerizable water-soluble ethylenic unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinyl benzyl dimethyl ammonium chloride, alkali metal and ammonium salts of a 2-sulfoethylacrylate, sodium styrene sulfonate, 2-aminoethylmethacrylate hydrochloride, alkali metal and ammonium salts of vinyl benzyl sulfonates and the like. The preferred copolymers of this invention are the copolymers of acrylamide with either sodium acrylate or dimethylaminoethyl methacrylate. The preferred ratio of acrylamide to sodium acrylate is 70:30 while the preferred ratio of acrylamide to dimethylaminoethyl methacrylate is 95:5. When aqueous solutions of the monomers are used, they can vary widely in monomer content. Proportions between 70 and 30 percent by weight monomer correspondingly to 30 to 70 percent water are used, depending upon the monomer and the temperature of polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

In order to emulsify the monomer phase into the oil phase to give a water-in-oil emulsion, an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the disperse phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, napthas and, in certain instances, petrolatums may be used. A particularly useful oil from the standpoint of its physical and chemical properties is the branch-chain isoparaffinic solvent sold by Humble Oil and Refining Company under the tradename "Isopar M." Typical specifications of this narrow-cut isoparaffinic solvent are set forth below in Table I:

TABLE I

| Specification properties | Minimum | Maximum | Test method |
| --- | --- | --- | --- |
| Gravity, API at 60/60° F | 48.0 | 51.0 | ASTM D 287. |
| Color, Saybolt | 30 | | ASTM D 156. |
| Aniline point, ° F | 185 | | ASTM D 611. |
| Sulfur, p.p.m | | 10 | ASTM D 1266 (nephelometric mod.). |
| Distillation, ° F.: | | | |
| IBP | 400 | 410 | ASTM D 86. |
| Dry point | | 495 | ASTM D 86. |
| Flash point, ° F. (Pensky-Martens closed cup). | 160 | | ASTM D 93. |

Free radical yielding initiators useful in polymerizing ethylenic unsaturated monomers, such as benzoyl peroxide, lauroyl peroxide, 2,2'azobis(isobutyronitrile), potassium persulfate and the like are used in the polymerization, advantageously in amounts ranging between 0.02 and 1.0 percent by weight of the oil or monomer phase, depending upon the solubility of the initiator. Polymerization can also be carried out using high energy irradiation, or high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

The polymeric latex which is made by this procedure is inverted in the presence of water. The polymer-containing emulsion releases the polymer in water in a very short period of time.

The polymer-containing emulsions may be inverted by any number of means. The most convenient means resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on polymer. Good inversion often occurs within the range of 1.0 to 10% based on polymer.

The surfactants

The preferred surfactants are hydrophilic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfate, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as a surfactant.

Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkylaryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

The inverted polymeric latex is added to the industrial waste in the manner as generally known to the art. It should, of course, be kept in mind, as will be obvious to those skilled in the art, that the optimum dosage of chemical coagulants for any particular industrial waste to be treated is distinctly an individual problem and can be best determined only by actual tests. However, it has been generally found that the optimum dosage ranges from 5 to 60 p.p.m. of active polymeric latex based on the industrial waste solids. Generally, this is approximately equivalent to 0.1 to 20 pounds of polymeric latex per ton of waste solids.

Examples

As illustrative of the marked improvement of this invention, the thickening and dewatering ability of the inverted polymer latex was measured and compared to that of dry solid polymers dissolved in water. This study was performed on two different types of industrial wastes, a coal mining slurry having a 5% suspended solids and a pulp mill sludge having a 4% suspended solids. The coal mining slurry was obtained from a coal processor from West Virginia while the pulp mill sludge was obtained from a paper manufacturing in a midwestern state.

The results are shown in the following tables.

TABLE I.—COAL MINING SLURRY

| Run No. | Polymer | Polymer type | Dosage, percent | Solids settled, percent | Improvement, percent |
|---|---|---|---|---|---|
| 1 | Acrylamide-acrylic acid | Solid | 0.01 | 15 | |
| 2 | do | do | 0.05 | 21 | |
| 3 | do | do | 0.10 | 38 | |
| 4 | do | do | 0.30 | 52 | |
| 5 | do | Latex | 0.01 | 29 | 93 |
| 6 | do | do | 0.05 | 42 | 100 |
| 7 | do | do | 0.10 | 57 | 50 |
| 8 | do | do | 0.30 | 73 | 40 |
| 9 | Acrylamide-DMAEM | Solid | 0.05 | 19 | |
| 10 | do | do | 0.10 | 28 | |
| 11 | do | do | 0.30 | 39 | |
| 12 | do | do | 0.70 | 52 | |
| 13 | do | Latex | 0.05 | 31 | 65 |
| 14 | do | do | 0.10 | 49 | 75 |
| 15 | do | do | 0.30 | 62 | 58 |
| 16 | do | do | 0.70 | 85 | 63 |

WHERE: AMAEM is dimethylaminoethyl methacrylate. Acrylamide-acrylic acid ratios are 70:30.

TABLE II.—PULP MILL SLUDGE

| Run No. | Polymer | Polymer type | Dosage, percent | Solids settled, percent | Improvement, percent |
|---|---|---|---|---|---|
| 1 | Acrylamide-acrylic acid | Solid | 0.1 | 15 | |
| 2 | do | do | 0.5 | 32 | |
| 3 | do | do | 1.0 | 55 | |
| 4 | do | do | 2.0 | 73 | |
| 5 | do | Latex | 0.1 | 29 | 93 |
| 6 | do | do | 0.5 | 48 | 50 |
| 7 | do | do | 1.0 | 69 | 26 |
| 8 | do | do | 2.0 | 91 | 25 |
| 9 | Acrylamide | Solid | 0.5 | 13 | |
| 10 | do | do | 1.0 | 35 | |
| 11 | do | do | 1.5 | 48 | |
| 12 | do | do | 2.0 | 72 | |
| 13 | do | Latex | 0.5 | 26 | 100 |
| 14 | do | do | 1.0 | 48 | 40 |
| 15 | do | do | 1.5 | 61 | 29 |
| 16 | do | do | 2.0 | 90 | 26 |

NOTE.—Acrylamide-acrylic acid ratios are 70:30.

The effect of the polymeric latex as compared to the aqueous solution of the dry solid can be observed from these results. It is clearly shown that the polymer latex shows superior results to the dry solids.

We claim:

1. In a process for thickening or dewatering solids from industrial waste of the type wherein the following steps are performed:

(A) forming an aqueous solution of a water-soluble polymer or copolymer of acrylamide in water;

(B) adding said aqueous solution of polymer or copolymer of acrylamide in water formed in Step A to industrial wastes under floc forming conditions;

(C) allowing said solids to settle from said industrial wastes to provide a clear aqueous supernatant;

the improvement which comprises using an aqueous solution of polymer or copolymer of acrylamide in water which is prepared by the inversion of a polymeric latex in water, wherein said polymeric latex is produced by the steps of:

(a) forming a water-in-oil emulsion from:

(1) water which contains dissolved therein acrylamide or acrylamide with at least one other water-soluble ethylenic unsaturated monomer, thereby producing a monomer phase which has a concentration of from 30–70% by weight of said emulsion;

(2) a liquid hydrocarbon;

(3) a water-in-oil emulsifying agent in a concentration of from 0.1–10% by weight;

(4) a free radical initiator;

(b) heating said emulsion under free radical forming conditions to polymerize the acrylamide or acrylamide and at least one other water-soluble ethylenic unsaturated monomer which is contained in the emulsion; and (c) polymerizing said acrylamide or acrylamide and at least one other water-soluble ethylenic unsaturated monomer in the water-in-oil emulsion to produce said polymeric latex.

2. The method of claim 1 wherein the polymer is an acrylamide-sodium acrylate copolymer.

3. The method of claim 2 wherein the weight ratio of acrylamide to sodium acrylate is 70:30.

4. The method of claim 1 wherein the polymer is an acrylamide-dimethylaminoethyl methacrylate copolymer.

5. The method of claim 4 wherein the ratio of acrylamide to dimethylaminoethyl methacrylate is 95:5.

6. The method of claim 1 which comprises the addition to said industrial waste from about 5 to 60 p.p.m. of active polymeric latex based on solids.

7. The method of claim 1 wherein the polymer is an acrylamide homopolymer.

8. The method of claim 1 wherein the polymer is an acrylic acid homopolymer.

9. The method of claim 1 wherein the polymer is a dimethylaminoethyl methacrylate homopolymer.

10. The method of claim 1 wherein the liquid hydrocarbon is an aliphatic liquid hydrocarbon.

References Cited

UNITED STATES PATENTS

| 3,493,501 | 2/1970 | Eck | 210—54 |
| 3,479,284 | 11/1969 | Lees | 210—54 |
| 3,576,739 | 4/1971 | Ryznar | 210—54 |
| 3,493,500 | 2/1970 | Volk et al. | 210—54 |
| 3,658,772 | 4/1972 | Volk et al. | 210—54 X |
| 3,023,162 | 2/1962 | Fordyce et al. | 210—54 |

SAMIH N. ZAHARNA, Primary Examiner

T. G. WYSE, Assistant Examiner

U.S. Cl. X.R.

210—54

REEXAMINATION CERTIFICATE (416th)

United States Patent [19]

Spoerle et al.

[11] B1 3,790,476

[45] Certificate Issued * Nov. 12, 1985

[54] LATICES FOR INDUSTRIAL WASTE COAGULATION

[75] Inventors: F. Steven Spoerle, Oak Lawn; Elmer W. Palmer, Woodridge; Donald R. Anderson, Oswego; Alvin J. Frisque, La Grange, all of Ill.

[73] Assignee: Nalco Chemical Company, Chicago, Ill.

Reexamination Request:
No. 90/000,197, May 10, 1982

Reexamination Certificate for:
Patent No.: 3,790,476
Issued: Feb. 5, 1974
Appl. No.: 200,848
Filed: Nov. 22, 1971

[*] Notice: The portion of the term of this patent subsequent to Nov. 30, 1988 has been disclaimed.

Related U.S. Application Data

[63] Continuation-in-part of Ser. No. 92,031, Dec. 15, 1970, Pat. No. 3,624,019.

[51] Int. Cl.$^4$ .................................................. C02F 1/56
[52] U.S. Cl. ............................................................ 210/734
[58] Field of Search ............................................. 210/734

[56] References Cited

U.S. PATENT DOCUMENTS

| | | | |
|---|---|---|---|
| Re. 28,474 | 7/1974 | Anderson | 260/29.6 |
| Re. 28,576 | 10/1975 | Anderson et al. | 260/29.6 H |
| 1,793,983 | 2/1931 | Whittelsey . | |
| 2,407,946 | 9/1946 | Britton | 260/84 |
| 2,443,893 | 6/1948 | Collins | 260/29.6 |
| 2,486,191 | 10/1949 | Minsk | 260/89.7 |
| 2,504,667 | 4/1950 | Dunlop | 260/29.6 |
| 2,655,496 | 10/1953 | Adams | 260/85.5 |
| 2,661,334 | 12/1953 | Lummus | 252/8.5 |
| 2,689,219 | 9/1954 | Menaul | 252/8.5 |
| 2,751,368 | 6/1956 | Yost | 260/41 |
| 2,757,153 | 7/1956 | Bowen | 260/29.6 |
| 2,880,184 | 3/1959 | Groves | 260/3 |
| 2,982,749 | 5/1961 | Friedrich | 260/23 |
| 3,023,162 | 2/1962 | Fordyce | 210/54 |
| 3,041,318 | 6/1962 | Hess | 260/80 |
| 3,096,249 | 7/1963 | Prigal | 167/82 |
| 3,112,295 | 11/1963 | Marvel | 260/85.5 |
| 3,122,203 | 2/1964 | Hawkins | 166/38 |
| 3,122,220 | 2/1964 | Hawkins | 166/38 |
| 3,171,805 | 3/1965 | Suen | 210/54 |
| 3,211,708 | 10/1965 | Zimmermann | 260/78.5 |
| 3,223,663 | 12/1965 | Altobelli | 260/28.5 |
| 3,226,349 | 12/1965 | Cull | 260/29.6 |
| 3,251,814 | 5/1966 | Gentile | 260/80.3 |
| 3,259,570 | 7/1966 | Priesing | 210/53 |
| 3,282,874 | 11/1966 | Friedrich | 260/29.2 |
| 3,284,393 | 12/1966 | Vanderhoff | 260/29.6 |
| 3,298,982 | 1/1967 | Glenn | 260/23 |
| 3,350,338 | 10/1967 | Savage | 260/29.6 |
| 3,366,588 | 1/1968 | Booth | 260/23 |

(List continued on next page.)

FOREIGN PATENT DOCUMENTS

| | | |
|---|---|---|
| 528160 | 7/1956 | Canada . |
| 1051836 | 9/1959 | Fed. Rep. of Germany . |
| 1068893 | 11/1959 | Fed. Rep. of Germany . |
| 1089173 | 9/1960 | Fed. Rep. of Germany . |
| 1204411 | 11/1965 | Fed. Rep. of Germany . |
| 1239672 | 5/1967 | Fed. Rep. of Germany . |
| 2031572 | 12/1971 | Fed. Rep. of Germany . |
| 2322883 | 11/1974 | Fed. Rep. of Germany . |
| 2431795 | 1/1975 | Fed. Rep. of Germany . |
| 2154081 | 2/1975 | Fed. Rep. of Germany . |
| 2450705 | 4/1976 | Fed. Rep. of Germany . |
| 2248360 | 12/1977 | Fed. Rep. of Germany . |
| 797686 | 2/1936 | France . |
| 1485729 | 5/1967 | France . |
| 1524989 | 4/1968 | France . |
| 1577495 | 6/1969 | France . |
| 7316M | 10/1969 | France . |
| 10644 | 12/1959 | Japan . |
| 21237 | 10/1963 | Japan . |
| 13662 | 7/1965 | Japan . |
| 6512328 | 6/1966 | Netherlands . |
| 6707702 | 12/1967 | Netherlands . |
| 841127 | 7/1960 | United Kingdom . |
| 905779 | 9/1962 | United Kingdom . |
| 991416 | 5/1965 | United Kingdom . |
| 1281683 | 7/1972 | United Kingdom . |
| 1478987 | 7/1977 | United Kingdom . |

OTHER PUBLICATIONS

The Dow Chemical Company, "SEPARAN", 1961.
Japanese Book "Kaimen Kasseizai Bin Ran (Handbook of Surface Active Agents)", Jul. 5, 1960, pp. 318-323; and translation thereof.
American Cyanamid Company, "Magnifloc Flocculants", (1971).
W. D. Bancroft, The Theory of Emulsification, V, J. Phys. Chem. 17, 501-518, (1913).
Becker, Emulsions-Theory and Practice, pp. 49-53, (2nd Ed., 1965).
P. Beecher, Emulsions, Theory and Practice, pp. 71-72, 155-169, (Reinhold Pub. Corp., 2nd Ed., 1965).
W. Clayton, The Theory of Emulsions and Emulsification, p. 75, (1923).

(List continued on next page.)

*Primary Examiner*—Thomas G. Wyse
*Attorney, Agent, or Firm*—Hume, Clement, Brinks, Willian & Olds, Ltd.

[57] ABSTRACT

Thickening or dewatering solids from industrial wastes comprising the addition of an aqueous solution of a water-soluble vinyl addition polymer made by the inversion of a polymeric latex.

U.S. PATENT DOCUMENTS

| | | | |
|---|---|---|---|
| 3,377,250 | 4/1968 | Hansen | 167/87 |
| 3,384,544 | 5/1968 | Walton | 167/78 |
| 3,402,137 | 9/1968 | Fischer | 260/29.6 |
| 3,412,060 | 11/1968 | Sarem | 260/29.6 |
| 3,415,772 | 12/1968 | La Heij | 260/33.6 |
| 3,418,237 | 12/1968 | Booth | 210/54 |
| 3,424,705 | 1/1969 | La Heij | 260/23.7 |
| 3,468,322 | 9/1969 | Katzer | 137/1 |
| 3,472,767 | 10/1969 | Lees | 210/52 |
| 3,479,283 | 11/1969 | Harrison | 210/54 |
| 3,479,284 | 11/1969 | Lees | 210/54 |
| 3,483,155 | 12/1969 | Samour | 260/29.6 |
| 3,493,500 | 2/1970 | Volk | 210/54 |
| 3,493,501 | 2/1970 | Eck | 210/54 |
| 3,503,895 | 3/1970 | Whelan | 252/363.5 |
| 3,576,739 | 4/1971 | Ryznar | 210/54 |
| 3,622,533 | 11/1971 | O'Connor | 260/29.6 N |
| 3,624,019 | 11/1971 | Anderson et al. | 260/29.6 H |
| 3,637,564 | 1/1972 | Economou | 260/29.6 H |
| 3,654,994 | 4/1972 | Slagel | 260/29.6 E |
| 3,658,772 | 4/1972 | Voek | 260/80.3 N |
| 3,661,868 | 5/1972 | Baron | 260/80.3 N |
| 3,691,112 | 9/1972 | Baron | 260/29.6 |
| 3,714,136 | 1/1973 | Gershberg | 260/89.7 S |
| 3,779,969 | 12/1973 | Slagel | 260/29.6 E |
| 3,852,234 | 12/1974 | Venema | 260/29.6 H |
| 3,960,584 | 6/1976 | Savage | 106/178 |
| 3,979,349 | 9/1976 | Fink | 260/29.6 RW |
| 4,089,831 | 5/1978 | Chambers | 260/29.6 SQ |

OTHER PUBLICATIONS

R. L. Davidson and M. Sittig, Water-Soluble Resins, pp. 154–158, (1962); pp. 176–177, 197, (1968).

D. H. Elliott and F. S. Stow, Jr., "Solutions of Drag-reducing Polymers . . . ", J. Appl. Polymer Sci. 15, pp. 2743–2748, (1971).

H. J. Fiedler, "Chemie, Wirkung und Anwendungsgebiete . . . " in Wasser-Wirtschaft-Wassertechnik 8 (12), pp. 561–564, (1958).

Kirk-Othmer, Encyclopedia of Chemical Technology, "Gums, Natural", 10, 741–754, (Second Ed., 1966).

O. Neumueller, Roemps Chemie-Lexicon, Keyword "Inversion", pp. 1612–1613, (7th Ed.).

J. Reuter, "Einsatz Synthetischer Flockungsmittel . . . " Wasser, Luft, und Beitrieb, 13 (4), pp. 129–133, (1969).

J. W. Vanderhoff et al., "Inverse Emulsion Polymerization" in Polymerization and Polycondensation Processes, Advances in Chemistry Series, American Chemical Society, No. 34, pp. 32–51, (1962).

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6 lines 17-18:
Where: *DMAEM* [AMAEM] is dimethylaminoethyl methacrylate. Acrylamide-acrylic acid ratios are 70:30.

AS A RESULT OF REEXAMINATION, IT HAS BEEN DETERMINED THAT:

The patentability of claims 1-10 is confirmed.

New claims 11-25 are added and determined to be patentable.

*11. A method of thickening or dewatering solids from industrial wastes comprising the addition of an aqueous solution of a water-soluble polymer or copolymer of acrylamide, formed by the inversion of a polymeric latex, to an industrial waste under floc-forming conditions, and thereafter allowing the solids to settle from the industrial waste to provide a clear aqueous supernatant, wherein the polymeric latex has been produced by the steps of:*

*(a) forming a water-in-oil emulsion from:*
*(1) water which contains dissolved therein acrylamide or acrylamide with at least one other water-soluble ethylenic unsaturated monomer, thereby producing a monomer phase which has a concentration of from 30 to 70% by weight of the emulsion;*
*(2) a liquid hydrocarbon;*
*(3) a water-in-oil emulsifying agent in a concentration of from 0.1 to 10% by weight; and*
*(4) a free radical initiator; and*
*(b) heating the emulsion under free radical forming conditions to polymerize the acrylamide or acrylamide and at least one other water-soluble ethylenic unsaturated monomer which is contained in the emulsion, whereby to produce the polymeric latex.*

*12. A method of thickening or dewatering solids from industrial wastes, using an aqueous solution of a water-soluble polymer or copolymer of acrylamide, formed by*
*(a) forming a water-in-oil emulsion from:*
*(1) water which contains dissolved therein acrylamide or acrylamide with at least one other water-soluble ethylenic unsaturated monomer, thereby producing a monomer phase which has a concentration of from 30 to 70% by weight of the emulsion;*
*(2) a liquid hydrocarbon;*
*(3) a water-in-oil emulsifying agent in a concentration of from 0.1 to 10% by weight; and*
*(4) a free radical initiator;*
*(b) heating the emulsion under free radical forming conditions to polymerize the acrylamide or acrylamide and at least one other water-soluble ethylenic unsaturated monomer which is contained in the emulsion, whereby to produce a polymeric latex; and*
*(c) inverting the polymeric latex, whereby to form an aqueous solution of the water-soluble polymer or copolymer of acrylamide;*
*comprising the steps of:*
*A. adding the aqueous solution of the polymer or copolymer of acrylamide to industrial wastes under floc-forming conditions; and*
*B. allowing the solids to settle from the industrial wastes to provide a clear aqueous supernatant.*

*13. The method of claim 11 or claim 12 wherein the polymer is an acrylamide-sodium acrylate copolymer.*

*14. The method of claim 13 wherein the weight ratio of acrylamide to sodium acrylate is 70:30.*

*15. The method of claim 11 or claim 12 wherein the polymer is an acrylamide-dimethylaminoethyl methacrylate copolymer.*

*16. The method of claim 15 wherein the ratio of acrylamide to dimethylaminoethyl methacrylate is 95:5.*

*17. The method of claim 11 or claim 12 which comprises the addition to the industrial waste of from about 5 to 60 ppm of active polymeric latex based on solids.*

*18. The method of claim 11 or claim 12 wherein the polymer is an acrylamide homopolymer.*

*19. The method of claim 11 or claim 12 wherein the liquid hydrocarbon is an aliphatic liquid hydrocarbon.*

*20. The method of claim 1 wherein the polymer is an acrylamide-acrylic acid copolymer.*

*21. The method of claim 20 wherein the ratio of acrylamide to acrylic acid is 70:30.*

*22. The method of claim 11 wherein the polymer is an acrylamide-acrylic acid copolymer.*

*23. The method of claim 22 wherein the ratio of acrylamide to acrylic acid is 70:30.*

*24. The method of claim 12 wherein the polymer is an acrylamide-acrylic acid copolymer.*

*25. The method of claim 24 wherein the ratio of acrylamide to acrylic acid is 70:30.*